(12) United States Patent
Hou et al.

(10) Patent No.: US 8,755,162 B2
(45) Date of Patent: Jun. 17, 2014

(54) PROTECTION CIRCUIT

(75) Inventors: Chuan-Tsai Hou, Tu-Cheng (TW); Yi-Lan Liao, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 400 days.

(21) Appl. No.: 13/114,047

(22) Filed: May 24, 2011

(65) Prior Publication Data

US 2012/0268853 A1 Oct. 25, 2012

(30) Foreign Application Priority Data

Apr. 19, 2011 (TW) .............................. 100113473 A

(51) Int. Cl.
*H02H 7/00* (2006.01)
(52) U.S. Cl.
USPC ........................................................ 361/93.9
(58) Field of Classification Search
USPC ........................................................ 361/93.1
See application file for complete search history.

(56) References Cited

U.S. PATENT DOCUMENTS 5,910,690 A * 6/1999 Dorsey et al. ................. 307/141

* cited by examiner

*Primary Examiner* — Stephen W Jackson
(74) *Attorney, Agent, or Firm* — Novak Druce Connolly Bove + Quigg LLP

(57) ABSTRACT

A protection circuit includes a power supply, a resistor-capacitor (RC) parallel circuit, an inverter, first and second electronic switches. The RC parallel circuit is connected to the power supply through a first resistor. An input terminal of the inverter is connected to the power supply through the first resistor. A first terminal of the first electronic switch is connected to an output terminal of the inverter. A second terminal of the first electronic switch is grounded. A third terminal of the first electronic switch is connected to the power supply through a second resistor. A first terminal of the second electronic switch is connected to the third terminal of the first electronic switch. A second terminal of the second electronic switch is connected to an electronic device. A third terminal of the second electronic switch is connected to an output power supply.

3 Claims, 1 Drawing Sheet

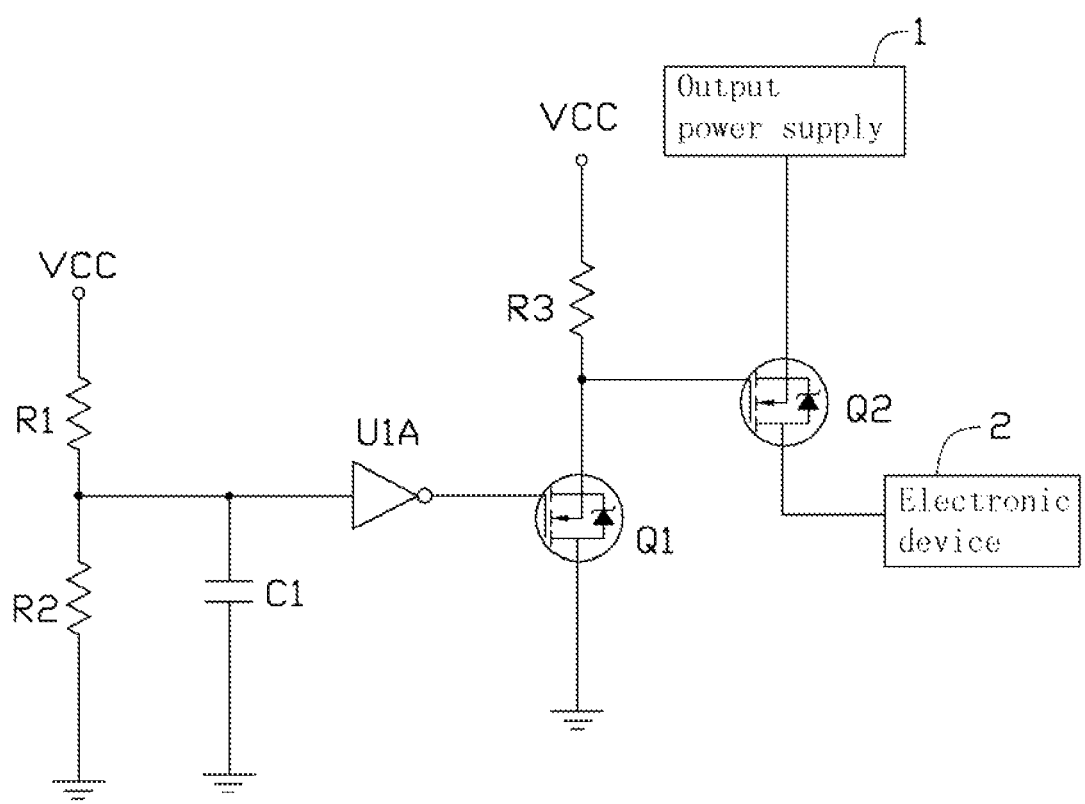

PROTECTION CIRCUIT

BACKGROUND

1. Technical Field

The present disclosure relates to a protection circuit.

2. Description of Related Art

Inrush current refers to the maximum instantaneous input current drawn by an electrical device when first turned on. The electrical device may be damaged because the inrush current may be far more than the maximum current the electrical device can accept. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

The FIGURE is a circuit diagram of an exemplary embodiment of a protection circuit.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Referring to the FIGURE, a protection circuit is connected between an output power supply 1 and an electronic device 2 to prevent the electronic device 2 from being damaged when the electronic device 2 is started. An exemplary embodiment of the protection circuit includes a power supply VCC, three resistors R1, R2, R3, a capacitor C1, an inverter U1A, and two p-type metal oxide semiconductor (PMOS type) transistors Q1 and Q2.

The power supply VCC is grounded through the resistors R1 and R2 in that order. A node between the resistors R1 and R2 is connected to an input terminal of the inverter U1A. The node is further grounded through the capacitor C1. An output terminal of the inverter U1A is connected to a gate of the transistor Q1. A source of the transistor Q1 is grounded. A drain of the transistor Q1 is connected to the power supply VCC through the resistor R3. A gate of the transistor Q2 is connected to the drain of the transistor Q1. A drain of the transistor Q2 is connected to the output power supply 1. A source of the transistor Q2 is connected to the electronic device 2.

The resistor R2 and the capacitor C1 makes up of a RC parallel circuit. When the output power supply 1 is turned on, the power supply VCC is also turned on. At this time, the power supply VCC charges the capacitor C1. At the moment when the output power supply VCC is turned on, the charge on the capacitor C1 is zero. As a result, the input terminal of the inverter U1A receives a low level signal. According to the characteristic of the inverter, the output terminal of the inverter U1A outputs a high level signal. The transistor Q1 is turned off. The gate of the transistor Q2 receives a high level signal. The transistor Q2 is turned off. As a result, the output power supply 1 cannot output power to the electronic device 2.

In time, the power supply VCC charges the capacitor C1. When the voltage on the capacitor C1 equals to a turn-on voltage of the transistor Q1, the transistor Q1 is turned on. The gate of the transistor Q2 receives a low level signal. The transistor Q2 is turned on. As a result, the output power supply 1 outputs the voltage to the electronic device 2.

In other embodiments, the PMOS type transistors Q1 and Q2 can be replaced with other type of transistors, such as, NMOS or BJT transistors.

The foregoing description of the embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A protection circuit comprising:
   a power supply;
   a resistor-capacitor (RC) parallel circuit connected to the power supply through a first resistor;
   an inverter, wherein an input terminal of the inverter is connected to the power supply through the first resistor;
   a first electronic switch, wherein a first terminal of the first electronic switch is connected to an output terminal of the inverter, a second terminal of the first electronic switch is grounded, a third terminal of the first electronic switch is connected to the power supply through a second resistor; and
   a second electronic switch, wherein a first terminal of the second electronic switch is connected to the third terminal of the first electronic switch, a second terminal of the second electronic switch is connected to an electronic device, a third terminal of the second electronic switch is connected to an output power supply.

2. The protection circuit of claim 1, wherein the first electronic switch is a p-type metal oxide semiconductor transistor, wherein a gate of the transistor is the first terminal of the first electronic switch, a source of the transistor is the second terminal of the first electronic switch, a drain of the transistor is the third terminal of the first electronic switch.

3. The protection circuit of claim 1, wherein the second electronic switch is a p-type metal oxide semiconductor transistor, wherein a gate of the transistor is the first terminal of the second electronic switch, a source of the transistor is the second terminal of the second electronic switch, a drain of the transistor is the third terminal of the second electronic switch.

* * * * *